(12) United States Patent
Sutton et al.

(10) Patent No.: US 11,738,404 B2
(45) Date of Patent: *Aug. 29, 2023

(54) METHOD TO ELIMINATE DISSIMILAR METAL WELDS

(71) Applicant: Electric Power Research Institute, Inc., Charlotte, NC (US)

(72) Inventors: Benjamin Sutton, Charlotte, NC (US); David Wayne Gandy, China Grove, NC (US)

(73) Assignee: Electric Power Research Institute, Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/684,492

(22) Filed: Mar. 2, 2022

(65) Prior Publication Data
US 2022/0184728 A1 Jun. 16, 2022

Related U.S. Application Data

(63) Continuation of application No. 15/473,722, filed on Mar. 30, 2017, now Pat. No. 11,298,774.
(Continued)

(51) Int. Cl.
| | |
|---|---|
| *B23K 20/00* | (2006.01) |
| *B23K 20/02* | (2006.01) |
| *B23K 20/227* | (2006.01) |
| *B23K 20/16* | (2006.01) |
| *B23K 35/02* | (2006.01) |
| *B23K 35/30* | (2006.01) |
| *B23K 103/04* | (2006.01) |

(Continued)

(52) U.S. Cl.
CPC ............ *B23K 20/021* (2013.01); *B23K 20/16* (2013.01); *B23K 20/227* (2013.01); *B23K 35/0255* (2013.01); *B23K 35/3033* (2013.01); *B23K 2101/06* (2018.08); *B23K 2103/04* (2018.08); *B23K 2103/05* (2018.08); *B23K 2103/18* (2018.08)

(58) Field of Classification Search
CPC ...... B22F 3/15; B22F 2207/01; B23K 20/021; B23K 2101/001; B23K 2103/18
See application file for complete search history.

(56) References Cited

U.S. PATENT DOCUMENTS

| | | | | |
|---|---|---|---|---|
| 4,333,670 | A * | 6/1982 | Holko | .................. B23K 35/004 228/175 |
| 8,703,045 | B2 * | 4/2014 | Mitchell | ................. B22F 7/062 419/49 |

(Continued)

*Primary Examiner* — Erin B Saad
(74) *Attorney, Agent, or Firm* — Trego, Hines & Ladenheim, PLLC

(57) ABSTRACT

A method of eliminating dissimilar metal welds has been disclosed. The method includes the steps of providing a first part having a first alloy composition; providing a second part having a second alloy composition different from the first part; connecting a containment structure to the first part; pouring a powder into the containment structure such that the powder is in contact with the first part; positioning a portion of the second part in the containment structure such that the second part compresses the powder between the first and second parts; and performing hot isostatic pressing (HIP) to consolidate the powder and join the first and second parts together.

6 Claims, 7 Drawing Sheets

Related U.S. Application Data

(60) Provisional application No. 62/316,791, filed on Apr. 1, 2016.

(51) Int. Cl.
    *B23K 103/18*    (2006.01)
    *B23K 101/06*    (2006.01)

(56) References Cited

U.S. PATENT DOCUMENTS

| | | | |
|---|---|---|---|
| 10,500,672 B2 * | 12/2019 | Bush | B23K 9/232 |
| 2006/0086776 A1 * | 4/2006 | Gandy | B23K 20/021 |
| | | | 228/119 |
| 2006/0207503 A1 * | 9/2006 | Meneghini | C23C 16/4485 |
| | | | 118/715 |
| 2010/0028705 A1 * | 2/2010 | Keegan | F16L 13/007 |
| | | | 228/175 |
| 2011/0088510 A1 * | 4/2011 | Pandey | C22C 1/0416 |
| | | | 419/23 |
| 2011/0194663 A1 * | 8/2011 | Hori | F16L 5/022 |
| | | | 376/352 |
| 2013/0121868 A1 * | 5/2013 | Gandy | B22F 3/15 |
| | | | 164/80 |
| 2017/0282288 A1 * | 10/2017 | Sutton | B23K 20/021 |

* cited by examiner

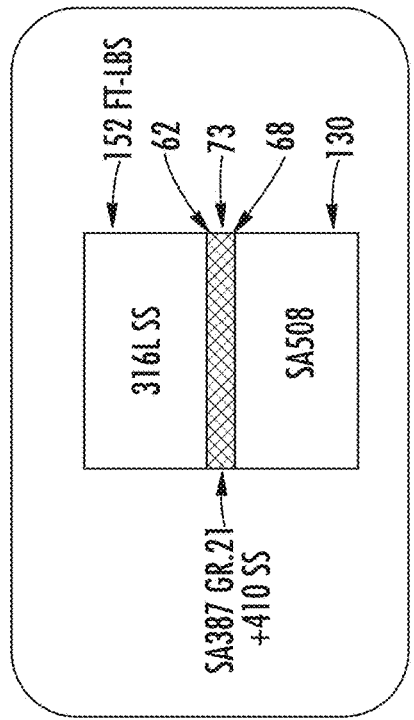
FIG. 3
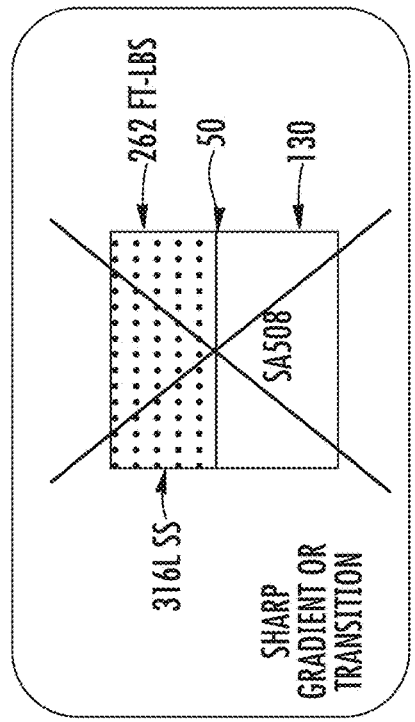
FIG. 5
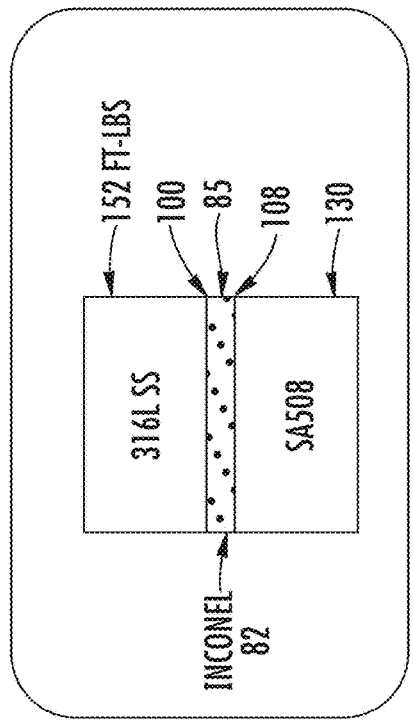
FIG. 2
FIG. 4

METHOD TO ELIMINATE DISSIMILAR METAL WELDS

BACKGROUND OF THE INVENTION

This invention relates generally to a method of joining dissimilar metals, and more particularly to a method of eliminating dissimilar metal welds.

For purposes of discussion, the invention will be described with reference to eliminating dissimilar metal welds (DMWs) for nozzle-to-safe end applications, such as those employed in nuclear and fossil plants; however, it should be appreciated that the invention is not limited to nozzle-to-safe end applications and is applicable to the elimination of DMWs in other applications.

Joining nozzle-to-safe end dissimilar materials has always been accomplished using a welding process. However, nozzle-to-safe end welds are often difficult to produce since they require the use of multiple weld filler metals and an intermediate post weld heat treatment (PWHT) during their assembly. The weld joint is commonly comprised of an SA508 low alloy steel nozzle joined to a 304L or 316L stainless steel safe end. Due to the differences in the material compositions, the nozzle is first machined to the appropriate weld bevel and a nickel-based alloy such as Alloy 82 is applied to the face of the bevel. This is often referred to as "weld buttering". The weld is then post weld heat treated (PWHT) to assure proper tempering of the low alloy steel just below the deposited nickel-based filler. Also, prior to PWHT, a weld clad using 308L/309L or Alloy 52 clad may be applied along the inside diameter surface of the nozzle.

Once the nickel-based filler has been applied and the tempered condition has been generated for the nozzle (via the weld butter), a second weld is commonly required to join the buttered nozzle to the stainless steel safe end. A nickel-based alloy such as Alloy 182, 82, or 52 may be used to join these alloys. See FIG. 1 for an example of a nozzle-to-safe end joint.

Due to the number of different materials and the reflectors generated at the transition of the alloys, DMWs are also difficult to inspect. When damage is found, it is often isolated on the nozzle weld butter side (Alloy 182/82) of the joint which normally dictates that the entire weld is removed and then repaired. This can be both time consuming and costly to a utility company.

Accordingly, there remains a need for a method that eliminates the DMWs entirely.

BRIEF SUMMARY OF THE INVENTION

This need is addressed by the present invention, which uses PM-HIP to consolidate a nickel-based powder between two substrate materials (a low alloy steel and a stainless steel) thereby eliminating the need for a weldment entirely.

According to one aspect of the invention, a method of joining dissimilar metals includes the steps of providing a first part having a first alloy composition; providing a second part having a second alloy composition different from the first part; connecting a containment structure to the first part; pouring a powder into the containment structure such that the powder is in contact with the first part; positioning a portion of the second part in the containment structure such that the second part compresses the powder between the first and second parts; and performing hot isostatic pressing (HIP) to consolidate the powder and join the first and second parts together.

According to another aspect of the invention, a method of joining dissimilar metals without welding includes the steps of providing a first part having a first alloy composition; providing a second part having a second alloy composition different from the first part; connecting and sealing a containment structure to the first part; pouring a powder into the containment structure such that the powder is in contact with the first part; positioning a portion of the second part in the containment structure such that the second part compresses the powder between the first and second parts and connecting and sealing the second part to the containment structure to form a complete assembly; and placing the complete assembly in a high pressure containment vessel and performing hot isostatic pressing (HIP) to consolidate the powder and join the first and second parts together.

According to an aspect of the invention, a method of joining dissimilar metals includes the steps of providing a first part having a first alloy composition; providing a second part having a second alloy composition different from the first part; connecting a containment structure to the first part; pouring a first powder capable of joining with the first alloy into the containment structure such that the first powder is in contact with the first part; pouring a second powder capable of joining with the first powder and the second alloy such that the second powder is in contact with the first powder; positioning a portion of the second part in the containment structure and in contact with the second powder such that the second part compresses the first and second powders between the first and second parts; and performing hot isostatic pressing (HIP) to consolidate the first and second powders and join the first and second parts together.

BRIEF DESCRIPTION OF THE DRAWINGS

The invention may be best understood by reference to the following description taken in conjunction with the accompanying drawing figures, in which:

FIG. 2 shows Charpy impact testing results for a first configuration using PM-HIP nozzle-to-safe end joining;

FIG. 3 shows Charpy impact testing results for a second configuration using PM-HIP nozzle-to-safe end joining;

FIG. 4 shows Charpy impact testing results for a third configuration using PM-HIP nozzle-to-safe end joining;

FIG. 5 shows Charpy impact testing results for a fourth configuration using PM-HIP nozzle-to-safe end joining;

DETAILED DESCRIPTION OF THE INVENTION

Figure 1:
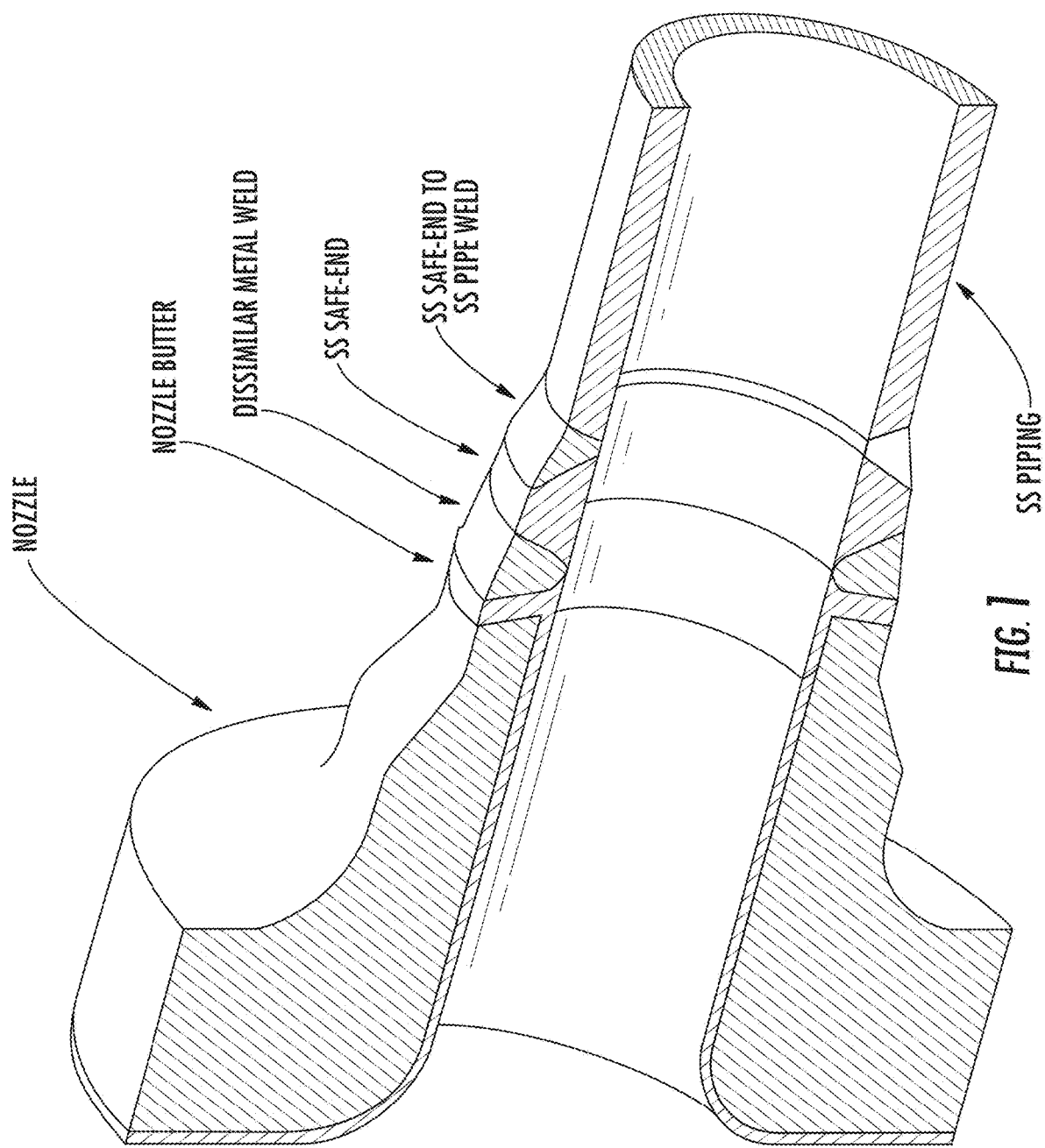
FIG. 1 illustrates a nozzle-to-safe end weld joint.
Figure 7:
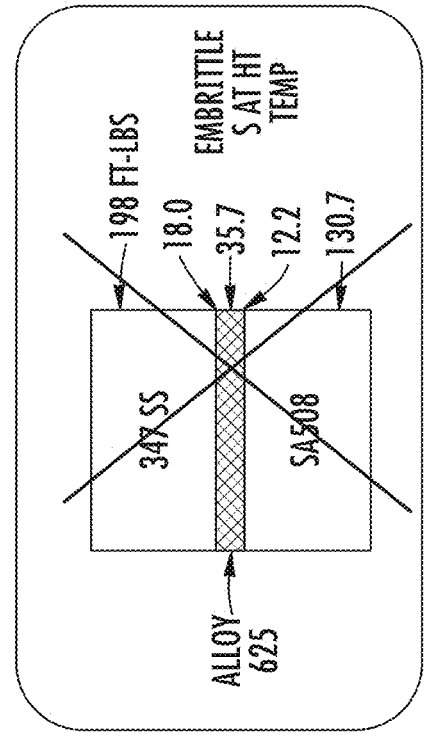
FIG. 7 shows Charpy impact testing results for a sixth configuration using PM-HIP nozzle-to-safe end joining.
Figure 6:
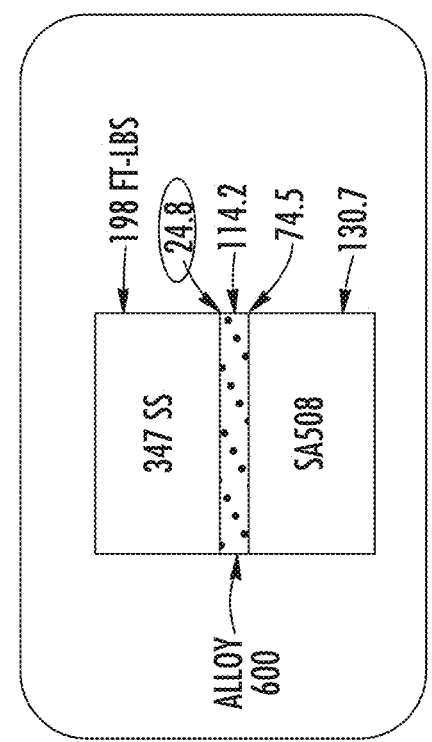
FIG. 6 shows Charpy impact testing results for a fifth configuration using PM-HIP nozzle-to-safe end joining.
Figure 8:
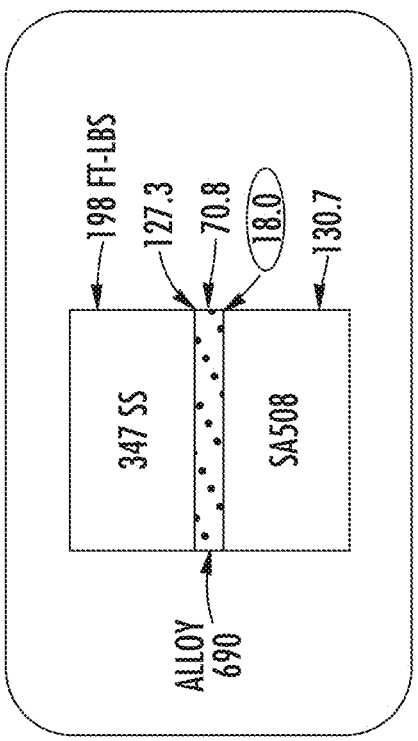
FIG. 8 shows Charpy impact testing results for a seventh configuration using PM-HIP nozzle-to-safe end joining.

Recent advances in powder metallurgy-hot isostatic pressing (PM-HIP) have demonstrated PM-HIP is capable of providing high quality low alloy steel, nickel-based alloys, and stainless steels for pressure retaining applications that are readily inspectable, couple two different alloys such as bi-metallics for corrosion resistance or wear applications, and that eliminates the need for DMWs.

Referring to the drawings wherein identical reference numerals denote the same elements throughout the various views, FIGS. 2-11 illustrate test results for various configurations using the method of the current invention. The current invention uses powder metallurgy and hot isostatic pressing (PM-HIP) to consolidate a nickel-based powder between two substrate materials (a low alloy steel and a stainless steel) thereby eliminating the need for a weldment entirely.

Several tests have been conducted to determine which PM-HIP process provides the best properties (tensile, toughness, U-bends, hardness, and microstructure)—seven different joint configurations are discussed herein. These configurations have utilized one or more consolidated powders that bridge the gap between the two dissimilar materials and are shown in FIGS. 2-8.

The primary advantage of the PM-HIP joint versus a welded joint is that multiple alloys and weld joint angles are eliminated. Straight side walls are employed between the nickel-based powders and the two substrate materials (SA508 and austenitic stainless steel) resulting in an easily inspectable interface. The interface regions found in dissimilar metal welds today exhibit multiple weld bevel angles and geometric reflectors associated with welding.

Figure 11:
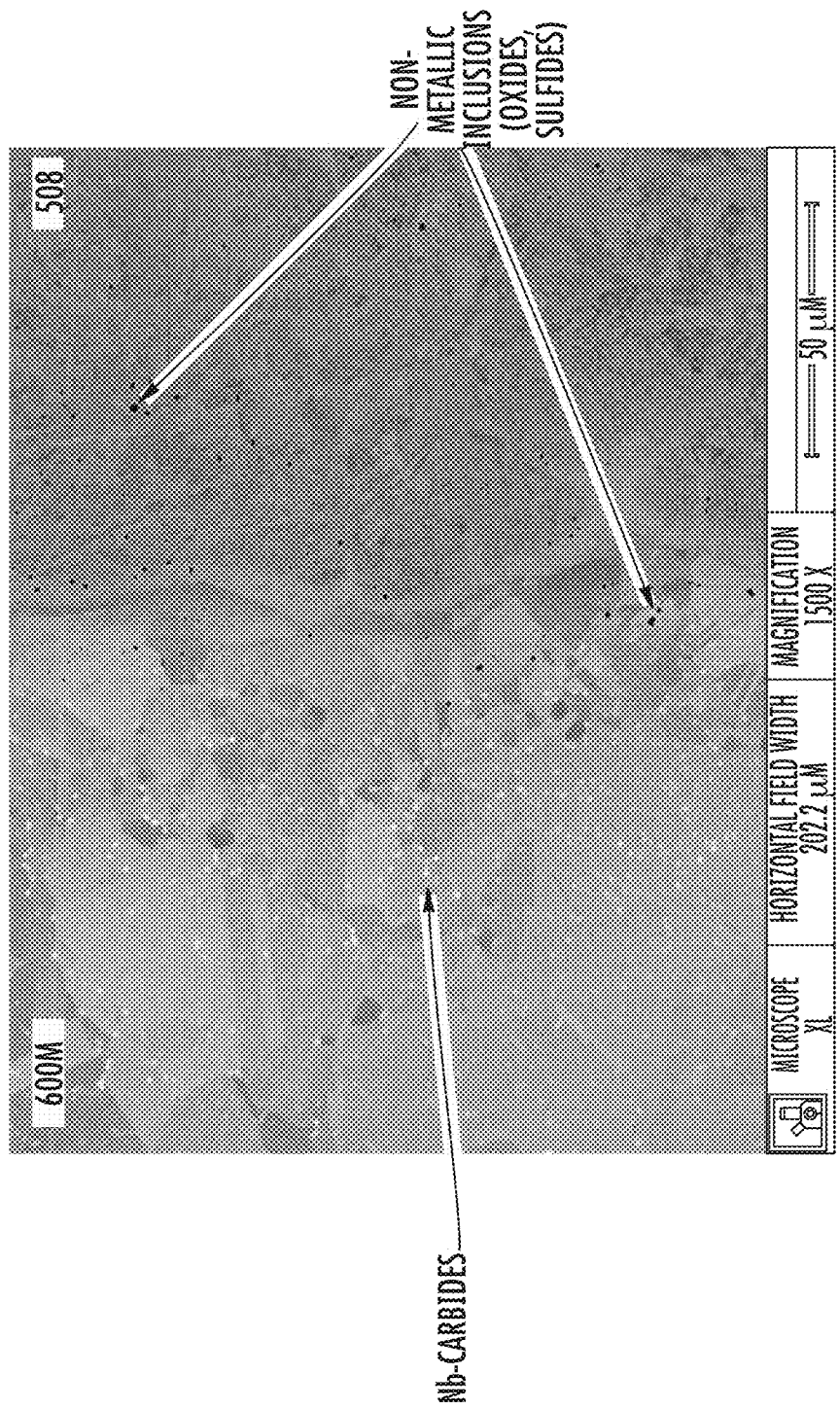
FIG. 11 shows a microstructure of an Alloy 600M interlayer and 600M-508 interface associated with the fifth configuration of FIG. 6.

The second advantage of the proposed PM-HIP application described herein is that the use of 600M or other niobium bearing powders minimizes the formation of detrimental chromium carbides at the 508 interface region, thereby producing good properties, see FIG. 11.

Figure 9:
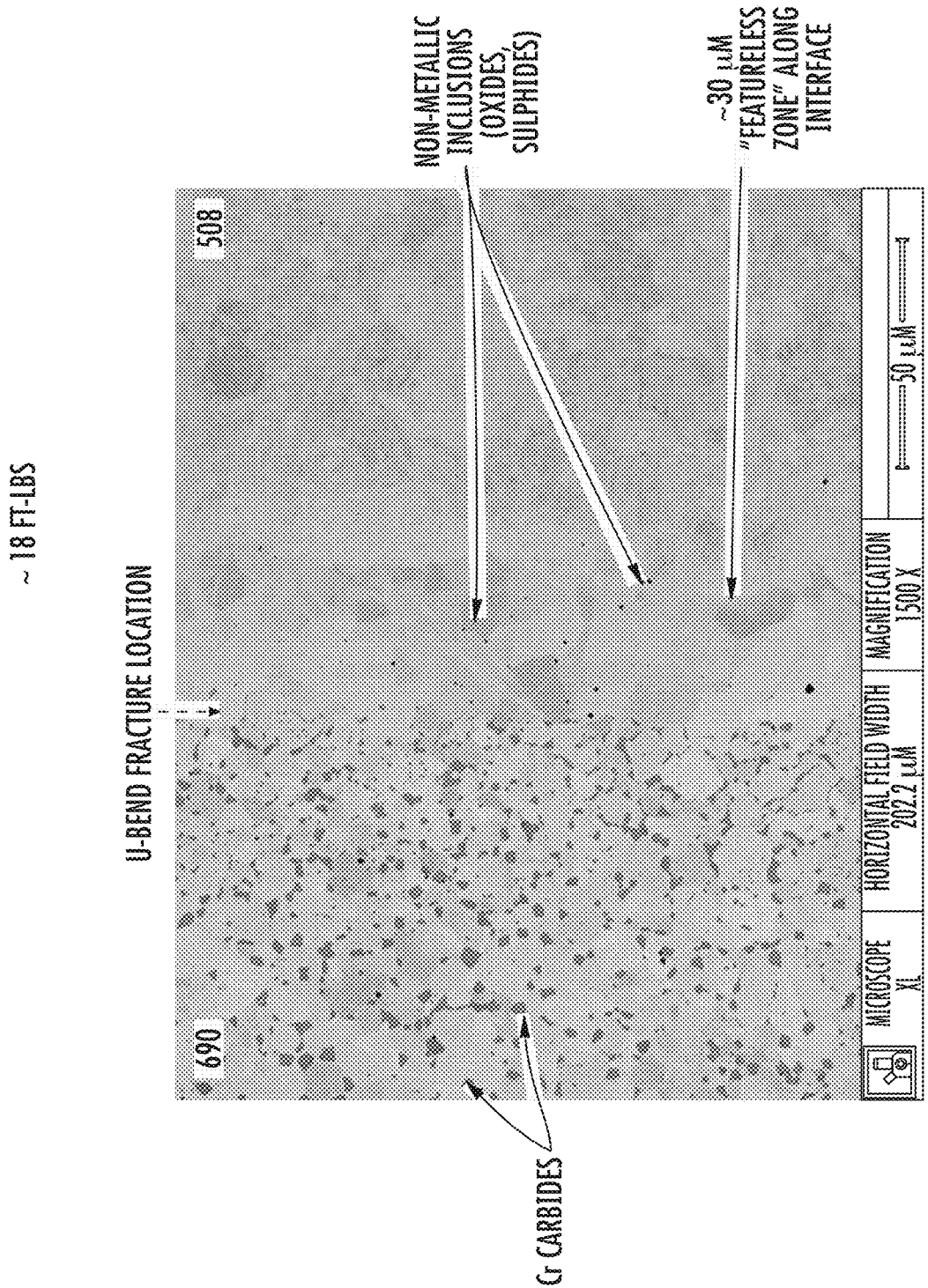
FIG. 9 shows a microstructure of an Alloy 690 interlayer and 690-508 interface associated with the seventh configuration of FIG. 8.
Figure 10:
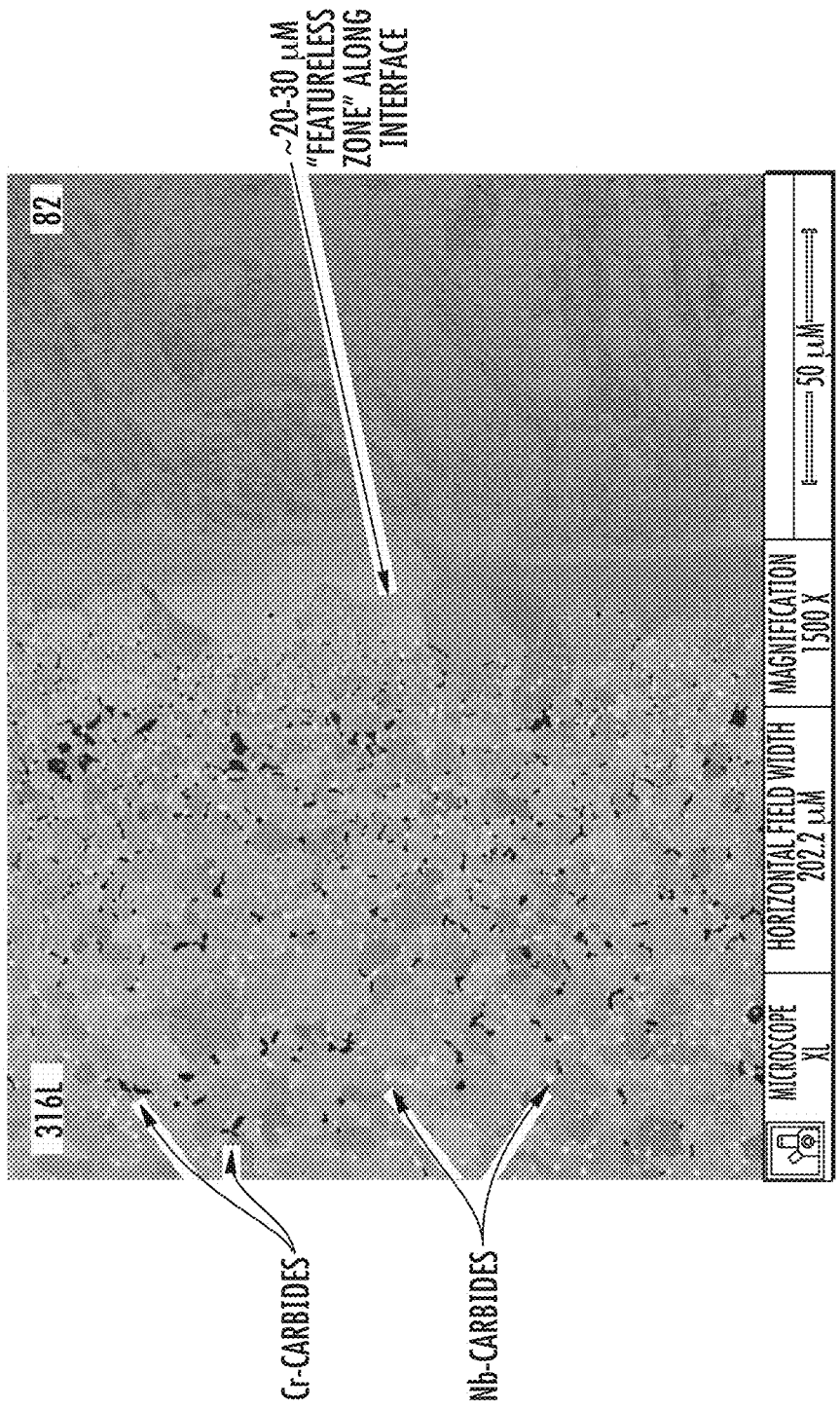
FIG. 10 shows a microstructure of an Alloy 82 interlayer and 82-508 interface associated with the first configuration of FIG. 2.

Low Alloy Steel Side of Joint. The best configuration was determined to be one that included an Alloy 600M consolidated powder between the two alloys, FIG. 6. Detailed investigation of several of the joint configurations suggested that during HIP consolidation and processing, and subsequent heat treatment, carbon diffusion from the SA508 low alloy steel readily occurs at the interface boundary between the 508 material and a nickel-based powder (FIGS. 9 and 10). The result is a distinct layer of M23C6 carbides at the interface region which leads to low ductility and toughness in this area.

Utilization of the Alloy 600M powder as the joining media minimizes the development of the M23C6 carbides (M is usually Chromium). Stable niobium carbides are formed near the interface region, as shown in FIG. 11. Nb-carbides do not appear to detrimentally affect tensile, hardness, bend, or toughness properties at the interface region. The premise behind this effort is that niobium ties up the carbon before it is able to join up with the chromium (which as noted earlier produces detrimental properties).

While this discussion has focused on 600M powder, any Nb-bearing nickel-based alloy powder, such as alloys 600M, 713C, 718, 725, 52M and any other suitable powder, would serve the same purpose.

Stainless Steel Side of Joint. The above discussion has focused solely on the SA508 side of the joint. For the stainless steel side of the joint, it was shown that a high-chromium nickel alloy, for example Alloy 690 or 690 Alloy (UNS NO6690), powder produces an excellent joint. Unfortunately, 690 powder produces inferior properties when joined to the SA508 material as it does not contain Nb-carbides.

In terms of a single powder, it has been found that the best combination is a 600M powder used with SA508 low alloy steel and 316L stainless steel. Another solution is to have a joint that includes SA508-to-600M-690-austenitic stainless steel. In other words, utilization of two powders would be employed: Alloy 600M and 690. Alloy 600M provides a good transition to the 508 low alloy steel, while the 690 provides a good transition to the austenitic stainless steel side of the joint.

Another example of where dissimilar welds are used is in components where low alloy steel components are joined to nickel-based components. The method described above, may also be used to join these components. In this example, the nickel-based powders described above would still be used in a PM-HIP process as described above to eliminate dissimilar metal welds.

Figure 12:
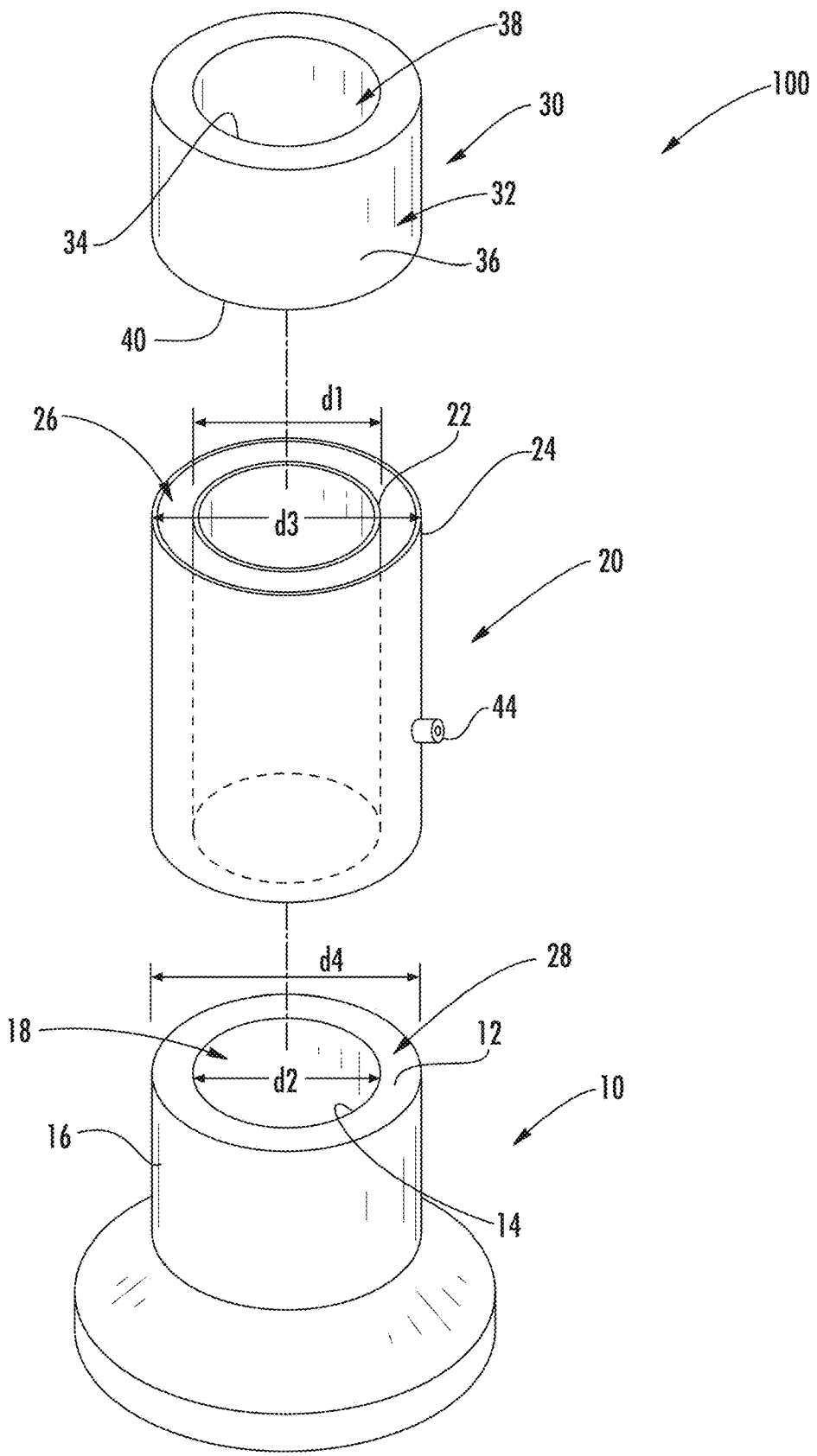
FIG. 12 is an exploded view of a nozzle-to-safe end joining by PM-HIP.

In use, FIG. 12, a first part of a first alloy is joined to a second part of a second alloy during the manufacturing process. For clarity, the following discussion is related to a nozzle (first part) and safe end (second part) of dissimilar metals being joined; however, it should be appreciated that the method is generally related to the joining of dissimilar metal parts without the use of DMWs.

The method joins a nozzle 10 and a safe end 30 of dissimilar metals. The method uses a nozzle having a wall 12 with an inner wall surface 14, an outer wall surface 16, and a bore 18 defined by the inner wall surface 14 and attaches a containment structure such as a shroud and/or can 20 thereto via welding or other suitable attachment means. The can 20 includes an inner sleeve 22 and an outer sleeve 24. The inner sleeve 22 has an outside diameter "d1" similar to and/or equal to a diameter "d2" of the bore 18 to allow the inner sleeve 22 to be inserted into the bore 18 and connected to the inner wall surface 14 of the nozzle 10. The outer sleeve 24 has an inner diameter "d3" similar to and/or equal to an outer diameter "d4" of the wall 12 to allow the outer sleeve 24 to slide over a portion of outer wall surface 14 and be connected thereto and form a channel 26 between the inner and outer sleeves 22, 24, substantially equal to a thickness of the wall 12.

Once the channel 26 is formed, the appropriate alloy powder and/or powders (i.e. two different alloy powders are used) may be poured into the channel 26, such that the powder rests in the channel 26 and against an end 28 of the nozzle 10. With the powder contained in the channel 26, a safe end 30 having a wall 32 with an inner wall surface 34, an outer wall surface 36, and a bore 38 defined by the inner wall surface 34 is positioned in the channel 26 such that the wall 32 is positioned in the channel 26 with the inner sleeve 22 positioned in the bore 38 and the outer sleeve 24 extends over a portion of the outer wall surface 36. The inner sleeve 22 and outer sleeve 24 are connected to the safe end 30 in the same manner as they are connected to the nozzle 10 to seal the can 20 around the nozzle 10 and safe end 30. It should be understood that the powder contained in the channel is compressed between the end 28 of the nozzle 10 and an end 40 of the safe end 30.

With the nozzle 10, safe end 30, can 20, and powder all properly assembled into assembly 100, a vacuum is pulled on the entire assembly 100 through one or more access ports 44 (fill stems). The access ports 44 are then crimped and welded shut. The assembly 100 is then placed into a high pressure containment vessel and subjected to hot isostatic pressing (HIP) where elevated temperatures and gas pressures are used to consolidate the powder and join the nozzle 10 to the safe end 30. Once the HIP process has finished, the can 12 is removed from the assembly and any needed finish machining can be performed.

The foregoing has described a method of eliminating dissimilar metal welds. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying claims, abstract and drawings), or to any novel one, or any novel combination, of the steps of any method or process so disclosed.

We claim:

1. A method of joining dissimilar metals without welding, comprising the steps of:
   (a) providing a first part having a first alloy composition;
   (b) providing a second part having a second alloy composition different from the first part;
   (c) connecting a containment structure to the first part;
   (d) pouring a first powder having a third alloy composition capable of joining with the first alloy composition into the containment structure such that the first powder is in contact with the first part, wherein the first powder is a Niobium (Nb)-bearing nickel-based alloy powder;
   (e) pouring a second powder having a fourth alloy composition capable of joining with the third alloy composition of the first powder and the second alloy composition of the second part such that the second powder is in contact with the first powder, wherein the second powder is a 690 alloy powder;
   (f) positioning a portion of the second part in the containment structure and in contact with the second powder such that the second part compresses the first and second powders between the first and second parts; and
   (g) performing hot isostatic pressing (HIP) to consolidate the first and second powders and join the first and second parts together.

2. The method according to claim 1, wherein a first sleeve of the containment structure is connected to an inner surface of a wall of the first part and a second sleeve of the containment structure is connected to an outer surface of the wall of the first part.

3. The method according to claim 2, wherein the first and second sleeves create a channel therebetween to receive the first and second powders therein.

4. The method according to claim 3, wherein the first and second powders are compressed in the channel between an end of the first part and an end of the second part.

5. The method according to claim 1, further including the step of connecting the containment structure to the second part.

6. The method according to claim 1, wherein the first part is a nozzle and the second part is a safe end.

* * * * *